(12) United States Patent
Hartung

(10) Patent No.: US 6,269,222 B1
(45) Date of Patent: Jul. 31, 2001

(54) LENS FOR A CAMERA

(75) Inventor: Hansjuergen Hartung, Wolfenbuettel (DE)

(73) Assignee: Rollei Fototechnic GmbH, Braunschweig (DE)

( * ) Notice: Subject to any disclaimer, the term of this patent is extended or adjusted under 35 U.S.C. 154(b) by 0 days.

(21) Appl. No.: 09/453,443

(22) Filed: Dec. 3, 1999

(30) Foreign Application Priority Data

Dec. 4, 1998 (DE) ............................................. 198 55 977

(51) Int. Cl.[7] ..................................................... G03B 17/00
(52) U.S. Cl. ............................................. 396/301; 396/532
(58) Field of Search .................................. 396/529, 531, 396/532, 267, 91, 93, 301

(56) References Cited

U.S. PATENT DOCUMENTS

| | | | |
|---|---|---|---|
| 4,439,029 | * 3/1984 | Okura et al. | 396/267 |
| 4,440,484 | 4/1984 | Komoto et al. | 396/298 |
| 4,541,700 | 9/1985 | Bletz et al. | 396/532 |
| 4,637,704 | 1/1987 | Ishimura et al. | 396/301 |
| 5,079,578 | * 1/1992 | Kohno et al. | 396/529 X |

FOREIGN PATENT DOCUMENTS

| | | |
|---|---|---|
| 34 38 322 | 4/1986 | (DE) . |
| 34 43 443 | 5/1986 | (DE) . |

* cited by examiner

Primary Examiner—W. B. Perkey
(74) Attorney, Agent, or Firm—Foley & Lardner

(57) ABSTRACT

A camera, in particular a system camera, with a camera housing and an interchangeable lens, which can be interchangeably fitted by a connection device, in particular a bayonet attachment, in a connect device of the camera housing, in particular a bayonet receptacle, in which, for supplying power to electrical actuating devices in the interchangeable lens, the connecting device of the camera housing has only two power supply contacts, to which two connection contacts are assigned in the connection device of the interchangeable lens, while exclusively one opto-coupling is provided in the interface for the purpose of transmitting control signals from the interchangeable lens to the camera housing and/or vice versa, the opto-coupling in each case having an optical signal generator and a signal pickup assigned thereto.

13 Claims, 2 Drawing Sheets

LENS FOR A CAMERA

BACKGROUND OF THE INVENTION

Field of the Invention

The invention relates to a camera, in particular to a system camera, with a camera housing and an interchangeable lens, which can be interchangeably fitted by means of a connection device, in particular a bayonet attachment, in a connecting device of the camera housing, in particular a bayonet receptacle.

Of interest are system cameras with interchangeable lenses, such as e.g. reflex system cameras and viewfinder system cameras, in which the lenses can be removed from the camera housing for transporting the reflex camera. Such lenses also make it possible to optionally use different lenses depending on the required framing. The lenses generally have electrical loads, such as, for example, an electrically actuable focus adjusting device and an electrically actuable aperture adjusting device. The lens and the camera housing have a plurality of electrical contacts, of which some serve to supply power to the lens and others to transmit signals between the lens and the camera housing for the selection of the various lens settings. In this case, the electrical contacts are arranged in the annular region of the bayonet fitting around the optical path of the cylindrical lens.

Since the electrical contacts are arranged essentially annularly next to one another on the lens and the camera housing, when a lens is fitted to the camera housing, undesirable momentary electrical connections may be made between contacts which are not supposed to be connected to one another. These momentary electrical connections can trigger short circuits and faulty connections which, under certain circumstances, can lead to damage to electronic parts of the lens or camera housing or cause functional disturbances in the adjusting devices of the lens. Moreover, the contacts can be abraded and blocked by dirt or moisture entering the connection region.

SUMMARY OF THE INVENTION

In view of the foregoing, it would be desirable to provide an interchangeable lens for a camera that minimizes spurious, momentary electrical connections which may lead to damage to electronic parts of the lens or camera housing. Accordingly, an object of the present invention is to provide a relatively simple connection device between the interchangeable lens and camera housing that ensures high functional reliability and interference immunity.

This object is achieved according to one embodiment of the invention by a camera, in particular a system camera, comprising a camera housing and an interchangeable lens, which can be interchangeably fitted by a connection device, in particular a bayonet attachment, in a connecting device of the camera housing, in particular a bayonet receptacle, in which, for supplying power to electrical actuating devices in the interchangeable lens, the connecting device of the camera housing has only two power supply contacts, to which two connection contacts are assigned in the connection device of the interchangeable lens, while exclusively an opto-coupling is provided in the interface for the purpose of transmitting control signals from the interchangeable lens to the camera housing and/or vice versa, wherein the opto-coupling in each case includes an optical signal generator and a signal receiver (or pickup) assigned thereto.

According to one embodiment of the invention, the signal transmission is thus separated from the power supply by the use of an opto-coupling for the purpose of signal transmission. As a result, any undesirable contact between the signal connections and power supply connections of the lens and of the camera housing during fitting of the lens is minimized. In principle, neither current nor information can be transmitted between the electrical contacts of the power supply and the opto-coupling components.

It is possible, in principle, for a momentary faulty connection to occur between the two connection contacts of the lens and the two power supply contacts of the camera housing, in which a contact of the lens touches the wrong contact of the camera housing and the other contacts are exposed. However, since no electric circuit is closed in such a case, no current can flow in this case either. Consequently, in the case of a design according to an embodiment of the invention of the lens or a camera having a lens of this type, a short circuit can no longer be triggered and erroneous information can no longer be transmitted.

In the case of the optical signal transmission, the optical signal emission and the optical signal reception can advantageously be separated by using a respective terminal just for the signal emission and another one just for the signal reception. This can be achieved in particular by the use of light emitting diodes for the signal emission and photodiodes for the signal reception.

Further features of the invention form the subject matter of the claims and will be explained in more detail, in conjunction with further advantages of the invention, with reference to exemplary embodiments.

BRIEF DESCRIPTION OF THE DRAWINGS

Exemplary embodiments of the invention are illustrated in the drawings, in which.

DETAILED DESCRIPTION OF THE PREFERRED EMBODIMENTS

The present invention relates to a camera, in particular to a system camera, with a camera housing and an interchangeable lens, which can be interchangeably fitted by a connection device, in particular a bayonet attachment, in a connecting device of the camera housing, in particular a bayonet receptacle. A lens of this type can be attached to a camera housing of a camera via the connection device, which can be designed as a bayonet, and be supplied with power via the camera housing. The interchangeable lens and camera housing can each include an opto-coupling, which can comprise an optical signal generator and an optical signal receiver.

Figure 1:
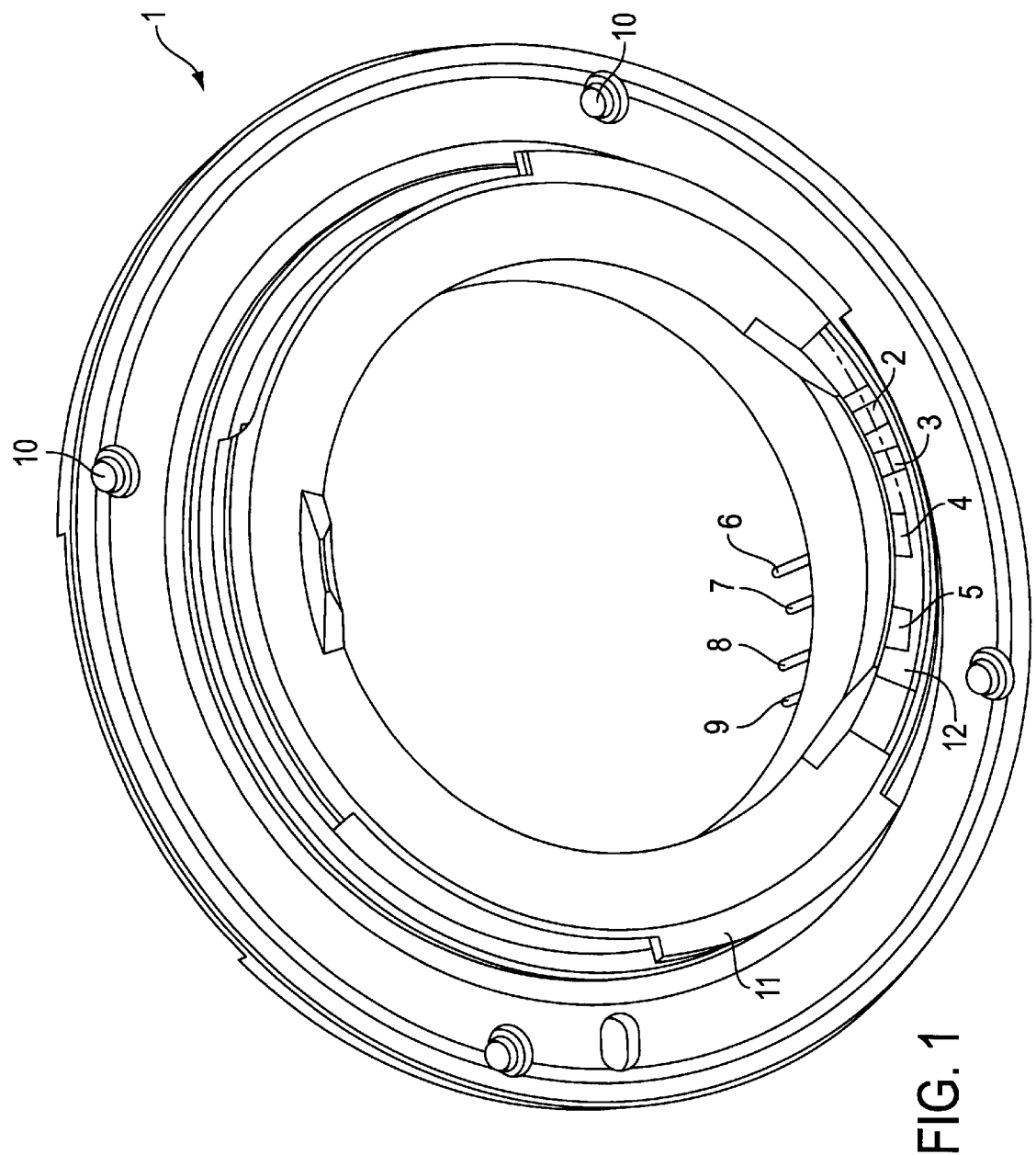
FIG 1. shows a connection device according to an embodiment of the present invention designed as a bayonet attachment, of an interchangeable lens.
Figure 3:
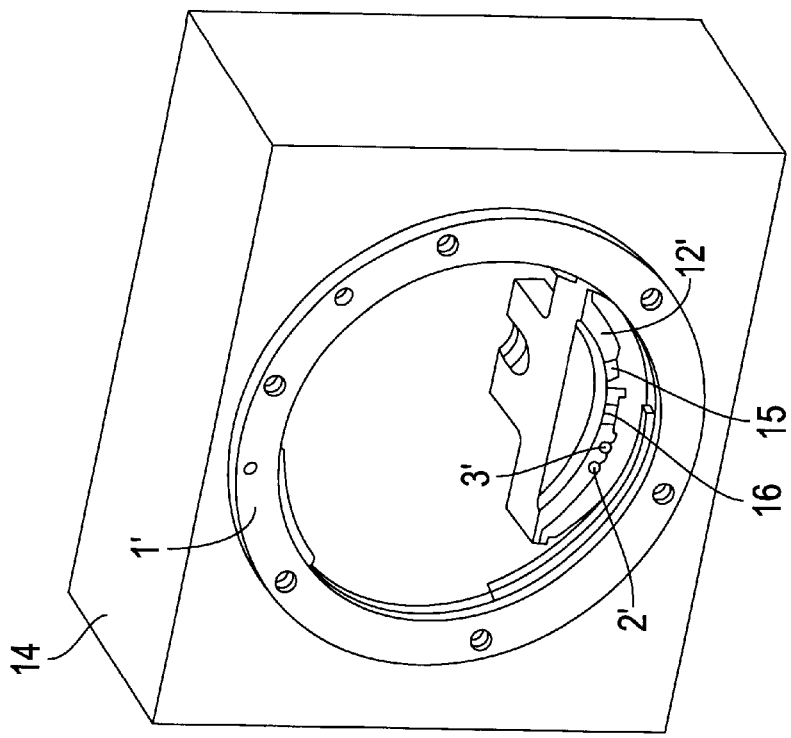
FIG 3. shows a schematic illustration of a camera housing with a bayonet receptacle according to an embodiment of the present invention.
Figure 2:
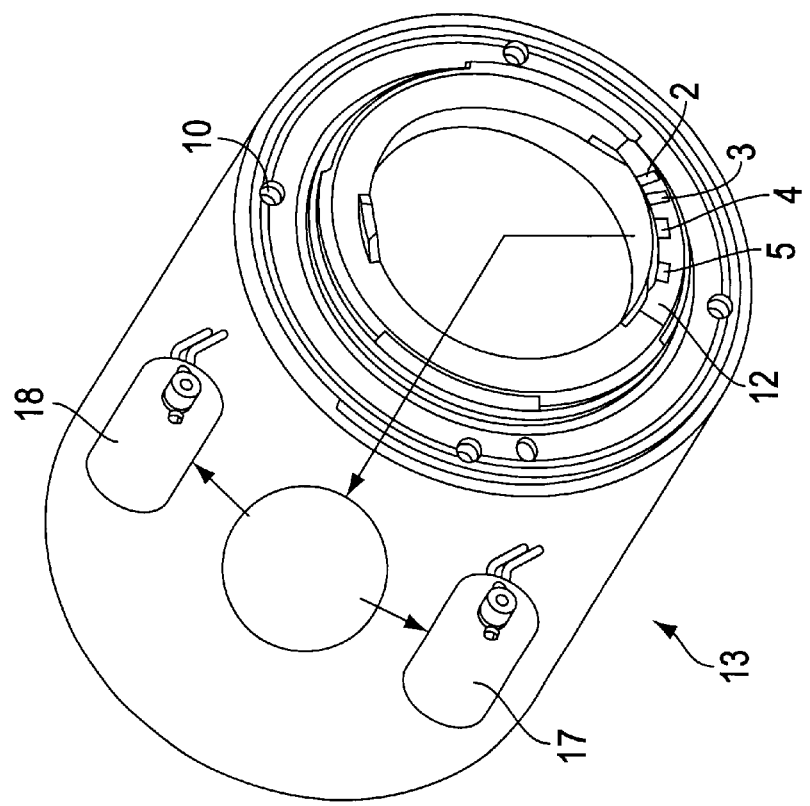
FIG 2. shows, on a small scale compared with FIG. 1, and interchangeable with a bayonet attachment according to FIG. 1.

As shown in FIGS. 1–3, viewed together, a connection device, such as a bayonet attachment 1, can be fastened to the body of an interchangeable lens 13 by way of screw holes 10. The bayonet attachment 1 has, in a known manner, projections 11 protruding radially outward and can be attached in a receptacle, such as a bayonet receptacle 1', of a camera housing 14 of a system camera, such as e.g. a reflex camera or a viewfinder system camera. Arranged on a connection area 12 of the bayonet attachment 1 are electrical connection contacts 2, 3.

An opto-coupling can be provided for the interchangeable lens and camera housing. The opto-coupling can include an optical signal generator and an optical signal receiver. For example, a light emitting diode, such as an infrared light emitting diode ("IR-LED") 4, and a photodiode, such as an infrared photodiode 5, are provided next to said connection contacts in the connection area 12. The connection contacts 2, 3 and the light emitting diode 4 and photodiode 5 serve as an optical connection mechanism and are spaced apart from one another annularly within the connection area 12. When the bayonet attachment 1 is fastened to the lens body, the light emitting diode 4 can be connected to the lens body via the pins 6, 7 and the photodiode 5 can be connected to the lens body via the pins 8, 9. The electrical connection contacts 2, 3 are likewise connected to the lens body via electrical contacts (not shown).

In one embodiment of the present invention, as shown in FIG. 3, the opto-coupling can further include a second LED, such as an IR light emitting diode 15, a second photodiode, such as IR photodiode 16, and two power supply contacts 2', 3', arranged on a corresponding mounting area 12' in the bayonet receptacle 1' of the camera housing 14, in such a way that when the lens bayonet 1 is fitted into the camera housing 14, the light emitting diode 15 on the housing is opposite the photodiode 5, the photodiode 16 on the housing is opposite the light emitting diode 4 and the power supply contacts 2', 3' are opposite the connection contacts 2, 3.

Thus, according to one aspect of the present invention, it is possible to ensure a power supply for electrical actuating devices in the interchangeable lens, such as, for example, an electrically actuable focus adjusting device 17 and/or an electrically actuable aperture adjusting device 18, via the connection contacts 2, 3. The electrical signals to be emitted by the interchangeable lens 13 can be fed via the pins 6, 7 to the light emitting diode 4 (see FIG. 1) and converted into optical or IR signals which are received by the photodiode 16 of the camera housing 14 and converted into electrical signals. Correspondingly, light signals emitted by LED 15 of the camera housing 14 are received by the photodiode 5, converted into electrical signals and forwarded via the pins 8, 9 to the actuating devices 17, 18. Since the signal reception of the interchangeable lens 13 via the photodiode 5 and the signal emission via the light emitting diode 4 are separated from one another, fast data transmission is ensured.

The interchangeable lens 13 with bayonet attachment 1 is attached in a known manner to the bayonet receptacle 1' of the camera housing 14 by firstly being axially emplaced and then being rotated.

Although the invention has been described above by reference to certain embodiments of the invention, the invention is not limited the embodiments described above. Modifications and variations of the embodiments described above will occur to those skilled in the art, in light of the above teachings. The scope of the invention is defined with reference to the following claims.

German Patent Application No. 198 55 977.1 , filed on Dec. 4, 1998, including the specification, the drawings, the claims, and the abstract, upon which this application is based, is incorporated herein by reference in its entirety.

What is claimed is:

1. A camera, comprising:
   a camera housing having a receptacle;
   an interchangeable lens interchangeably connectable to said housing via a connection device;
   two power supply contacts in said housing for supplying power to electrical actuating devices in said interchangeable lens;
   two connection contacts, corresponding to said power supply contacts, in said connection device of said interchangeable lens; and
   an opto-coupling at an interface of said camera housing and said connection device for transmitting and/or receiving control signals from said interchangeable lens and said camera housing, said opto-coupling comprising an optical signal generator and an optical signal receiver.

2. The camera according to claim 1, wherein said optical signal generator includes at least one light emitting diode and said optical signal receiver includes at least one photodiode.

3. The camera according to claim 1, wherein said optical signal generator and said optical signal receiver are electrically connectable to a body of said interchangeable lens via electrical contacts.

4. The camera according to claim 1, wherein said interchangeable lens further comprises an electrically actuable focus adjusting device.

5. The camera according to claim 1, wherein said interchangeable lens further comprises an electrically actuable aperture adjusting device.

6. The camera according to claim 1, wherein said camera is a system camera.

7. The camera according to claim 1, wherein said connection device comprises a bayonet attachment.

8. The camera according to claim 1, wherein said receptacle is a bayonet receptacle.

9. An interchangeable lens for use in a camera, comprising:
   a bayonet attachment for interchangeably connecting the interchangeable lens to a camera housing;
   two connection contacts coupled to corresponding electrical actuating devices; and
   an opto-coupling for transmitting optical control signals to and receiving optical control signals from a camera housing interface, said opto-coupling comprising an optical signal generator and an optical signal receiver.

10. The interchangeable lens according to claim 9, wherein said optical signal generator includes at least one light emitting diode and said optical signal receiver includes at least one photodiode.

11. A camera, comprising:
    a camera housing having a receptacle;
    two power supply contacts in said housing for supplying power to electrical actuating devices in an interchangeable lens interchangeably connectable to said housing via a connection device; and
    an opto-coupling at said receptacle for transmitting and receiving optical control signals, said opto-coupling comprising an optical signal generator and an optical signal receiver.

12. The camera according to claim 11, wherein said optical signal generator includes at least one light emitting diode and said optical signal receiver includes at least one photodiode.

13. A system camera, with a camera housing (14) and an interchangeable lens (13), which can be interchangeably fitted by means of a bayonet attachment (1) in a bayonet receptacle (1') of the camera housing (14), in which, for supplying power to electrical actuating devices (17, 18) in the interchangeable lens (13), the bayonet receptacle of the camera housing (14) has only two power supply contacts (2', 3'), to which two connection contacts (2, 3) are assigned in the bayonet attachment of the interchangeable lens (13), while exclusively an opto-coupling is provided in an interface for the purpose of transmitting control signals from the interchangeable lens (13) to the camera housing (14) and/or vice versa, said opto-coupling in each case having an optical signal generator (4, 15) and a signal pickup (5, 16) assigned thereto.

* * * * *